April 28, 1931.   W. J. HUNTER   1,802,382
INTERNAL COMBUSTION ENGINE
Filed Dec. 1, 1928    4 Sheets-Sheet 1

INVENTOR.
William J. Hunter
BY
Rolland S. Trott
ATTORNEY.

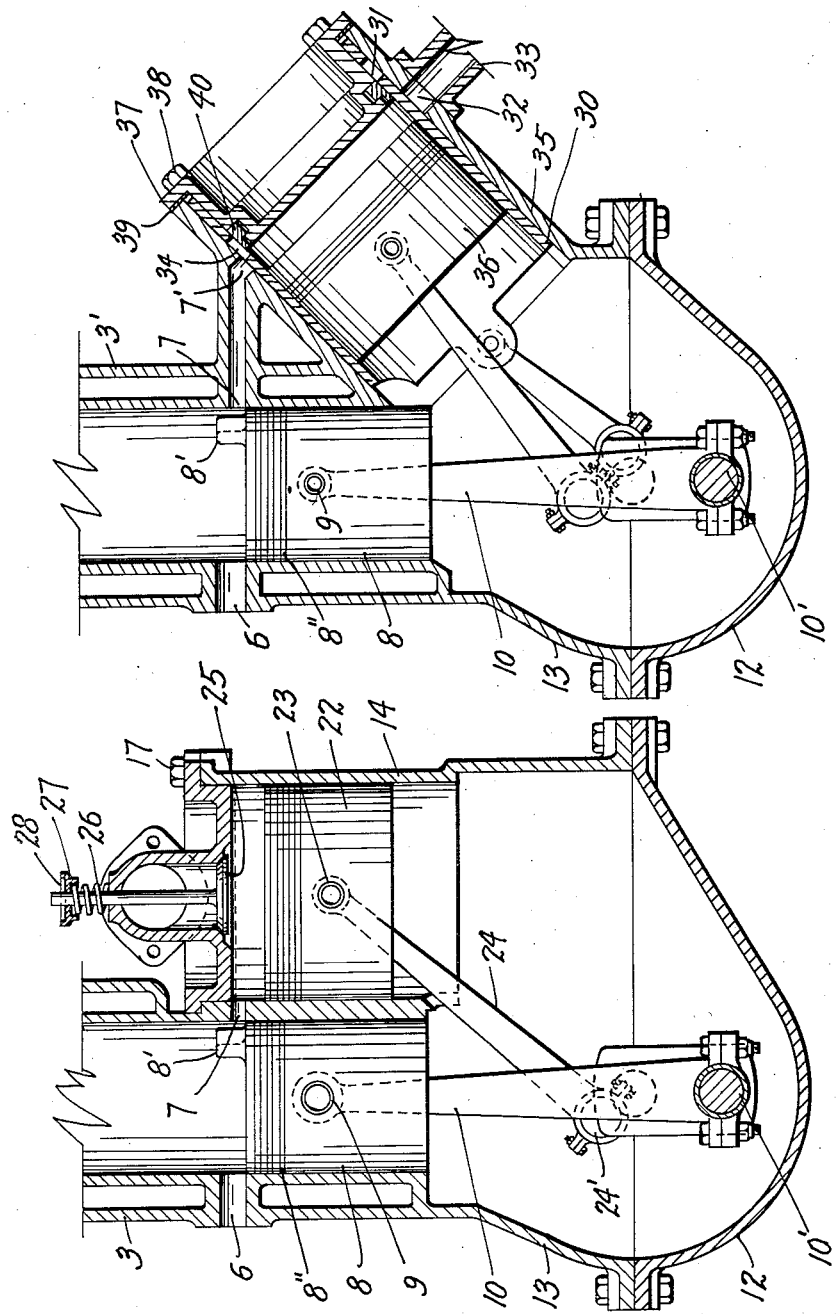

*INVENTOR.*
William J. Hunter
BY
Rolland S. Trott
*ATTORNEY.*

Patented Apr. 28, 1931

1,802,382

UNITED STATES PATENT OFFICE

WILLIAM J. HUNTER, OF DENVER, COLORADO

INTERNAL-COMBUSTION ENGINE

Application filed December 1, 1928. Serial No. 323,010.

My invention relates to internal combustion engines, and more especially to two stroke cycle engines, better known as two cycle engines.

In the ordinary two cycle engine, the cylinder is provided with exhaust and intake ports near the end of the down stroke of the piston.

The downward movement of the piston uncovers the exhaust port in the cylinder walls, and the exhaust takes place. This reduces the pressure in the cylinder to such an extent that the subsequent uncovering of the intake port in the cylinder walls by further movement of the piston permits the entrance of the next explosive charge.

In some forms of two cycle engines crankcase compression is used to compress each charge prior to its entrance into the cylinder through the intake port.

In other forms of two cycle engines, a compressor or pump cylinder and piston, or some other form of pump is used to compress each charge prior to its entrance into the cylinder through the intake port.

In other forms of two cycle engines crankcase compression under the working piston is used to force scavenging air through the cylinder after the opening of the exhaust port, the explosive charge being supplied by some means other than the crankcase compression.

In other forms a compressor or pump cylinder is used, and adapted to crankcase compression of scavenging air and cylinder compression of explosive charge, both of which are fed to the working cylinder.

In still other forms a double diameter piston having three displacement areas and operating in a double diameter cylinder is used, so that while one area of the piston is used as a working piston, the other areas may be used as a double acting pump to pump scavenging air and explosive charge, one of which is pumped by the use of compression in the crankcase.

When crankcase compression is used, by whatever construction, and whether used for either scavenging air or explosive charge, splash lubrication can not be used in the crankcase.

Also, when crankcase compression of the charge is used, and generally when prior compression of the charge is used by whatever means, the action on the carburetor is very poor due to the necessarily large compression space required to prevent excessive compression, and the correspondingly weak suction on the carburetor.

When means other than crankcase compression are used to effect the entrance of the explosive charge into the cylinder, whether with or without scavenging air, a pump piston provided with passages or ports or other constructions difficult for proper production, and expensive and complicated driving means for the pump piston are frequently used.

And, whenever the compression of the explosive charge before its entrance into the cylinder is used to effect the passage of the charge into the cylinder, the following considerations and disadvantages are met with:—

If low compression of the explosive charge is used the velocity of the charge moving into the cylinder is so low that high engine speed is not possible: and even at slow speeds it is impossible to transfer a full charge into the cylinder for the reason that after say half of the charge has been transferred, the compression is then so greatly reduced as to still further decrease the charge velocity; hence low compression means that an engine is for slow speed and can hardly be expected to transfer a full explosive charge into the cylinder at any speed.

If high compression is used, in order to get the high charge velocity necessary for the quick transfer that is required for high speed, then at the lower speeds, the high transfer velocity of the charge results in the passage of some of the charge entirely through the cylinder and out of the exhaust port.

That is, when initial compression of the charge is relied upon for its transfer into the cylinder, the compression must drop from the maximum to atmospheric pressure if a full charge is transferred, so that the last portion of the charge will have very little pressure to move it.

All this means that with a certain size of cylinder and ports and a certain amount of initial charge compression, there will be a limited range of engine speed, where the exhaust port will be closed just before the front end of the new charge begins to escape therefrom.

And, the amount of charge transferred, whether high or low compression is used, will be substantially the same proportion of a full charge as the proportion of the drop in compression pressure from the maximum to atmospheric pressure is to the maximum pressure.

But, above the above mentioned certain range of engine speed, the front end of the charge will not have time to travel through the cylinder far enough to get close to the exhaust port, which means that less charge will enter the cylinder; and below this certain range of engine speed, the front end of the incoming charge will have time to begin to pass out of the exhaust port and cause a loss of charge and fuel.

So, the final effect of transferring the fresh charge into the cylinder by an initial compression is that the cylinder can never receive a full charge and that the engine is limited for its best performance to a certain range of speed for each particular design, and does not possess the great flexibility and speed range of the four cycle engine, but is classed as a one speed engine.

Therefore, the object of my invention is to provide a two cycle engine in which no crankcase compression of either air or charge takes place, so that splash lubrication may be employed similar to that used in four cycle engines, and so that a proper action on the carburetor may be obtained.

A further object is to provide such a two cycle engine, in which initial compression of the explosive charge is not relied upon for the transfer of the charge to the cylinder, so that the engine will not be classed as a one speed engine.

A further object is to provide such a two cycle engine in which a standard type of pumping piston may be used, without any ports or passages therein.

A further object is to provide such a two cycle engine in which the pump piston may be driven direct from the crankshaft by a standard type of connecting rod.

A further object is to provide such a two cycle engine in which the directly driven, simple pumping piston is so proportioned as to bore, stroke and relation to the working cylinder in both position and action that the explosive charge is transferred at low pressure to the working cylinder by direct action of the pumping piston, whereby practically the entire charge is positively transferred regardless of the engine speed, and whereby a proper suction on the carburetor may be obtained as a result of the small clearance space in the pumping cylinder.

I attain the above results by providing a pumping cylinder of slightly greater displacement than the working cylinder, but of substantially half the length of stroke, the pumping cylinder being spaced along the crankshaft from the working cylinder for proper connecting rod and bearing construction, and with its axis preferably at an angle to that of the working cylinder, and by providing a proper angle between the working and the pumping cranks on the crankshaft, and by other details of construction which are clearly described below and are illustrated in the drawings, in which:—

Figure 2 is a fragmentary sectional view through a modified form and showing a modified form of valve construction.

Figure 3 is a fragmentary sectional view through a modified form showing another modified form of valve construction.

Figure 1:
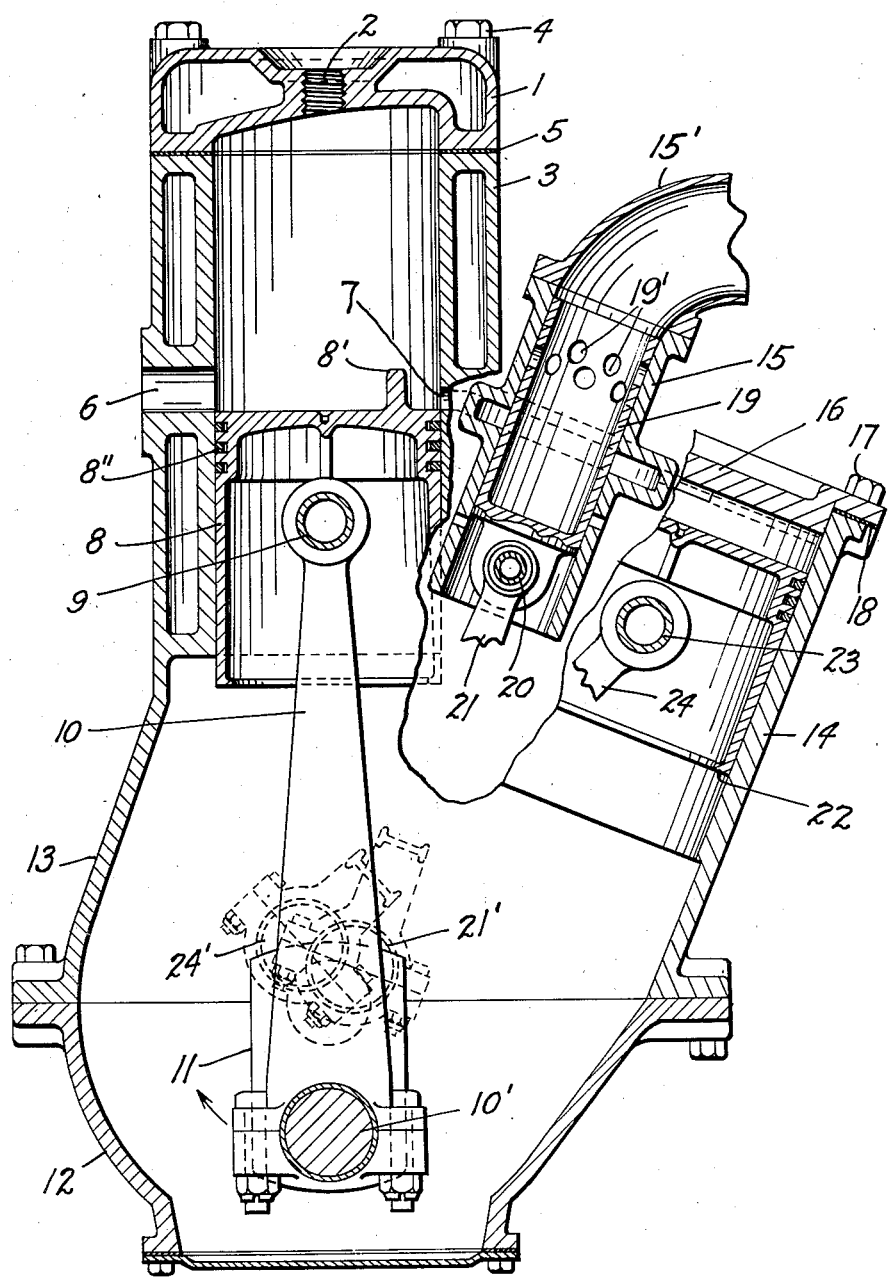
Figure 1 is a fragmentary sectional view through the working and pump cylinders and through the intake valve.

Figures 4, 5, 6, 7, 8, 9, and 10 are diagrams showing the position of some of the parts of the construction illustrated in Figure 1 at different points in the cycle.

Figures 11, 12, 13, 14, 15, 16, and 17 are diagrams showing the positions of some of the parts of the construction illustrated in Figure 3 at different points in the cycle.

In Figure 1, the cylinder head 1, is provided with the usual threaded aperture 2 for a spark plug, and is held to the working cylinder 3 by the bolts 4, the joint being made tight by the usual gasket 5.

The working cylinder 3 is provided with the exhaust port 6 and the intake port 7.

The working piston 8, provided with the usual baffle plate 8' and piston rings 8'' is mounted to reciprocate in the working cylinder 3, and is connected by the wrist pin 9 and the connecting rod 10 with the crank 10' of the crankshaft 11.

The lower case 12, with the upper case 13 forms the crankcase, the upper case 13 as shown being a part of the working cylinder 3 and forming a unit with the working cylinder 3 and the pump cylinder 14. A separate or individual construction for these parts may be used instead of this integral construction, if desired.

The intake port 7 connects with the valve cylinder 15 and with the pump cylinder 14.

The pump cylinder 14 is provided with the head 16 held in place by the bolts 17 and the joint made tight with the gasket 18.

The valve 19 is adapted to reciprocate in the valve cylinder 15 and through the ports 19' control the supply of explosive charge through the intake manifold 15', and is driven by the valve pin 20 and the valve rod 21, which last is mounted on the crank 21' of the crankshaft 11.

It will be observed that the crank 24' which connects with the pump piston 22, is approximately 157° in advance of the crank 10' which connects with the working piston 8; and that the crank 21' which connects with the valve 19 is approximately 59° in advance of the crank 24'.

This means the working piston closes the intake port 7 about 27° before up-center of the pumping piston.

This particular timing of the two pistons and the valve with respect to each other results in performance which can be best illustrated by the diagrams shown in Figures 4, 5, 6, 7, 8 and 9.

Figure 4:
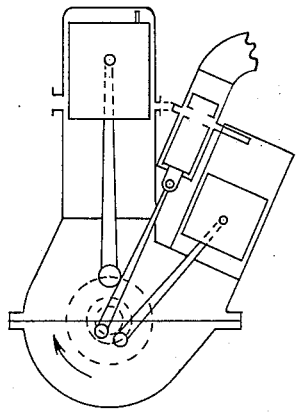

In Figure 4, the working piston 8 is on up center about to be driven downward by the explosion, the valve 19 is wide open, connecting the intake manifold 15' with the pump cylinder 14, and the pump piston 22 is about three quarters of the way down on its suction stroke.

Figure 5:
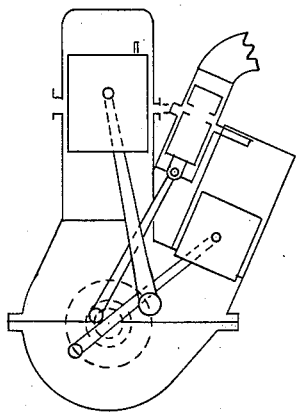

In Figure 5, the pumping piston 22 is on its down center at the end of the suction stroke, the valve 19 is about to close, as it closes late, as is the usual practice, and the working piston 8 is about a third of the way down on its explosion stroke.

Figure 6:
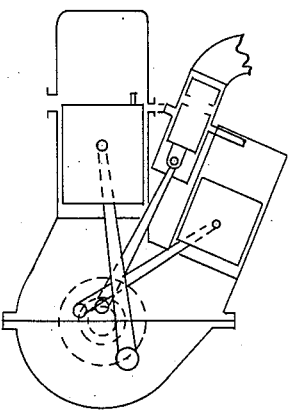

In Figure 6, the working piston 8 has uncovered the exhaust port 6 and allowed the exhaust to take place, and is just about to uncover the intake port 7. The valve 19 is closed, and the pumping piston 22 has returned only about a third of the way on its pumping stroke, so there is very little compression in the pump cylinder 14.

Figure 7:
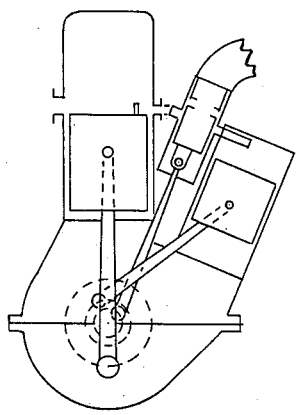

In Figure 7, the working piston 8 has moved on to its down center completely opening the intake port 7, the valve 19 is still closed and the pumping piston 22 has moved up about two thirds of its pumping stroke. This represents quite closely what would take place in the ordinary two cycle engine fed by a compressed explosive charge. That is, the space above the pumping piston 22 would represent the space in which the high compression of the charge had taken place. Some of the charge has escaped into the working cylinder, and the compression space is still full of charge which is probably at or near atmospheric pressure.

Figure 8:
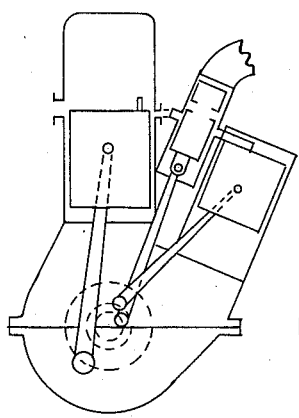

But, in my engine, even this last portion of the explosive charge is forced into the working cylinder as will be seen in Figure 8, in which the pumping piston has displaced a volume substantially equal to the displacement of the working piston.

In Figure 8, that is, the working piston is just closing the intake port 7, the valve 19 is still closed, and the pumping piston 22 is within about an eight of an inch of the end of its pumping stroke.

It will here be noted that the displacement of the pumping piston is to be such as to equal that of the working piston plus the displacement of this last eighth of an inch of pumping piston stroke, and the entire charge has been displaced into the working cylinder, therefore at the time the intake port 7 is closed.

Figure 9:
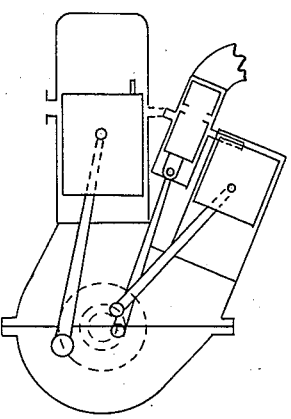

In Figure 9, the working piston 8 has moved upward about a fifth of its compression stroke, the valve 19 is still closed, and the pumping piston 22 is on its up center, having compressed the remaining charge, including that in the intake port 7, to about two thirds of its volume as shown in Figure 8. This final compression of the explosive charge by the pumping piston merely acts to cushion the piston on its up center, which is very desirable for high speeds.

Figure 10:
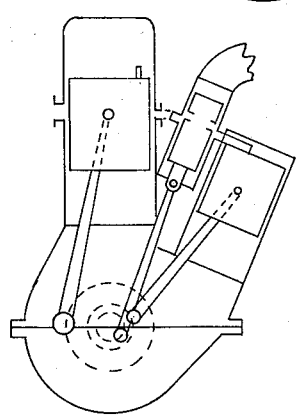

In Figure 10, the working piston 8 has moved upward about half of its compression stroke, the pumping piston 22 has started on its downward suction stroke, and the valve 19 has just opened to again connect the pumping cylinder with the intake manifold.

It will be seen from the above that the timing of the valve 19 is very close to the usual practice for intake valves, the working cylinder and ports and piston are very close to the usual practice in two cycle working cylinders and pistons, and the extra stroke length of the pumping piston and the very small clearance allowed above it, together with its timing with respect to the working piston all combine to provide little compression pressure at any time during the pumping stroke, so that the pumping piston in effect merely displaces and transfers the charge instead of pumping it under pressure into the working cylinder.

This action will be the same at either high or low speeds, or nearly so, so that the engine is not a one speed engine as explained above, but has as much speed range and flexibility as the four cycle engine.

The extremely small clearance space above the pumping piston 22 provides a very strong suction on the carburetor, even stronger than that found in the four cycle engine, besides insuring the transfer of the entire charge into the working cylinder.

And since the crankcase compression is not used, splash lubrication may be employed to lubricate both pistons and the valve and all rod and crankshaft bearings.

In the construction shown in Figure 1, the pump cylinder axis is at an angle to that of the working cylinder, this axis being tangent to a circle slightly larger than that of the working piston crank circle.

In the construction shown in Figure 2, the pump cylinder is parallel to the working cylinder, but the relative movements of the two pistons correspond quite closely to those of the construction shown in Figure 1, and illustrated in Figures 4 to 10.

The intake valve 25, is provided with the spring 26, washer 27 and pin 28, and operates through the suction of the pumping piston 22, the same as the usual automatic valve of this type.

This relation of the cylinders provides extremely small compression space, as is easily seen.

In Figure 3, the pump cylinder 35 is at an angle to the working cylinder 3' and its axis passes through the center of the crankshaft.

The working cylinder and piston are substantially the same as shown in the construction of Figure 1, but the valve is composed of a ported sleeve 30, driven by a connecting rod and crank on the crankshaft, similar to the drive for the valve 19 in Figure 1.

The intake port 31 of the sleeve 30 is adapted to register with the pump cylinder port 32, which registers with the intake manifold 33.

The by-pass port 34 of the sleeve 30 is adapted to register with the intake port 7' connecting with the working cylinder.

The sleeve 30 is constructed to have a close but freely working fit in the pump cylinder 35 for reciprocation therein, and the pump piston 36 has a close fit in the sleeve 30 and is adapted to reciprocate therein.

The pump cylinder head 37 is held in place by the bolts 38 and the fit thereon is made tight by the gasket 39.

The head 37 is provided with a groove for the receipt of the split junk ring 40, which bears against the inner surface of the sleeve 30 and acts to prevent any leakage upward along the sleeve.

The action and operation of the piston and the sleeve valve are shown clearly in Figures 11 to 17.

Figure 11:
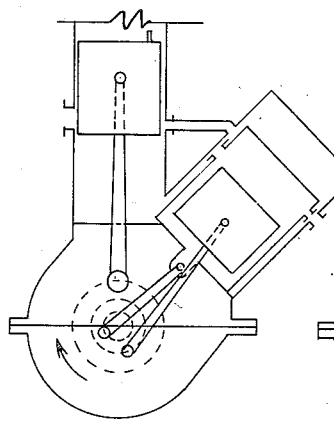

In Figure 11, the working piston 8 is on up center, the by-pass port 34 is closed, the intake port 31 is wide open, and the pump piston 36 is about three quarters down on the suction stroke.

Figure 12:
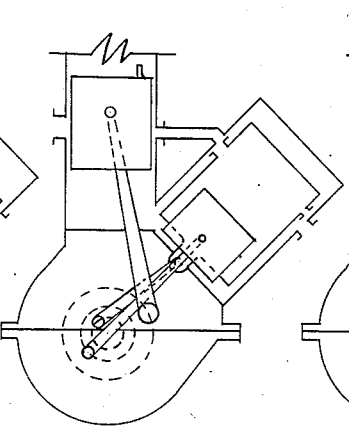

In Figure 12, the working piston 8 is about a third down on its working stroke, the by-pass port 34 is partly open, and the intake port 31 has just closed, the pump piston 36 is on its down center.

It will be noted that this closing of the intake port on the down center of the pump piston instead of allowing it to lag slightly, is a variation from the timing shown in the Figure 1 construction. But, it is understood that the exact timing of the events of the cycle is often a matter for the judgment of the designer to determine, and that the entire range within proper limits is available for both the Figure 1 and the Figure 3 constructions.

Figure 13:
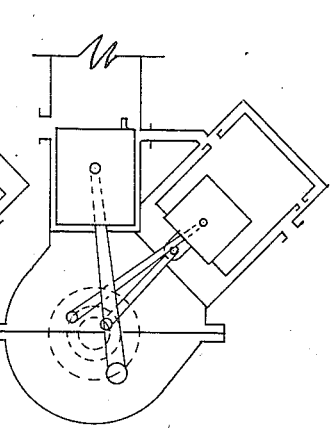

In Figure 13, the working piston 8 has opened the exhaust port 6 and permitted the exhaust to take place and is just about to open the intake port 7; the pump piston 36 has moved upward only about one third of its pumping stroke, which means a very low compression pressure in the pumping cylinder, the intake port 31 is closed, and the by-pass port 34 is wide open.

Figure 14:
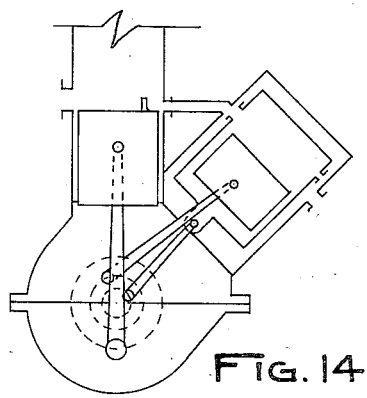

In Figure 14, the working piston 8 is at its down center, the by-pass port 34 is still almost wide open, the intake port 31 is still closed, and the pump piston 36 is about two thirds up on its pumping stroke.

Figure 15:
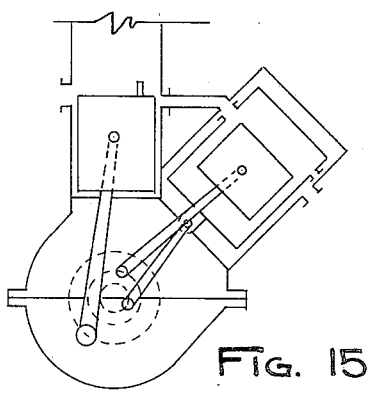

In Figure 15, the working piston 8 is just closing the intake port 7, the by-pass port 34 is wide open, the intake port 31 is still closed, and the pump piston 22 is about an eighth of an inch from up center.

Figure 16:
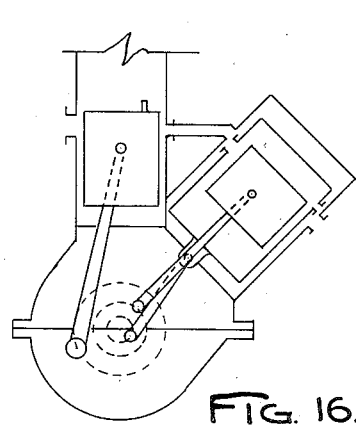

In Figure 16, the working piston is about one fourth of the way up on its up stroke, the by-pass port 34 is still open, and the intake port 31 is just about to open.

Figure 17:
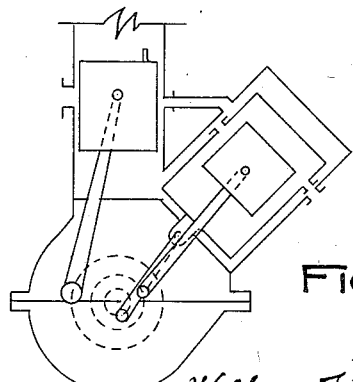

In Figure 17, the working piston 8 is about half way up on the compression stroke, the by-pass port 34 is closed, the intake port 31 is open, and the pump piston 36 is an eighth of an inch down from its up center position.

It will thus be seen that the action of the construction shown in Figure 3 is substantially the same as that shown in Figure 1, the main difference being in the different timing, which is a matter of choice.

It is of course understood that any of the three valve constructions shown can easily be adapted to any of the three pump cylinder constructions.

Naturally, any proper variation from either cylinder or valve or other constructions may be made without departing from the essence of my invention, so I do not wish to be narrowly restricted to the exact construction described and illustrated, but what I claim as new, and desire to protect by Letters Patent, is as follows:—

1. In an internal combustion engine, a working piston, a ported working cylinder in which the working piston reciprocates having an intake port adjacent the end of the stroke of the piston and an exhaust port positioned to be uncovered by the piston prior to the uncovering of the intake port, a crankshaft having a working piston crank, a connecting rod connecting the working piston to the said crank, a pump cylinder in communication with said intake port intermediate its two ends, a pump piston in the pump cylinder, a pumping piston crank on the crankshaft, a connecting rod connecting the pump piston to the pumping piston crank for reciprocation, the pumping piston crank being in advance of the working piston crank to time the pump piston to reach its up center after the closing of the intake port by the working piston, and means adapted to control the passage of explosive charges to the pump cylinder.

2. In an internal combustion engine, a working piston, a ported working cylinder having an intake port adjacent the end of the piston stroke and an exhaust port adapted to be uncovered by the piston prior to the uncovering of the intake port, a crankshaft having a working crank, a connecting rod connecting the working piston to the working crank, a pump cylinder provided with means for the control of the incoming charge and intermediate the limits of travel of the pumping piston being in communication with the intake port, a pump piston in the pump cylinder, a connecting rod connected to the pump piston, and a pumping crank on the crankshaft adapted to carry the pump connecting rod and angularly spaced from the working crank to time the pump piston to reach its up center after the closing of the intake port by the working piston.

3. In an internal combustion engine, a working piston, a ported working cylinder having an intake and an exhaust port, both adjacent the end of the working piston stroke, a pump cylinder, a communication passage connecting with the intake port and spaced from the delivery end of the pump cylinder, a crankshaft having a working crank, a rod joining the working crank to the working piston for the reciprocation thereof, a pump piston in the pump cylinder, a pumping crank on the crankshaft, a rod joining the pumping crank to the pump piston for the reciprocation thereof and adapted to provide a total pump piston stroke composed of a pumping stroke providing a displacement substantially equal to the displacement of the working piston and a cushion stroke adapted to cushion the pump piston after the closing of the intake port by the working piston, and means adapted to control the incoming charge to the pump cylinder, the pumping crank being angularly spaced from the working crank to provide said cushion stroke after the closure of the port by the working piston.

4. In an internal combustion engine, a working piston, a ported working cylinder having an intake and an exhaust port adjacent the end of the stroke of the piston, a pump cylinder, a communication passage connecting the pumping cylinder with the intake port and spaced from the delivery end of the pumping cylinder, a pump piston in the pump cylinder, the total displacement of the working piston being substantially equal to that of the pump piston measured at the instant the working piston closes the intake port, and before the end of the pump piston stroke, the stroke of the pump piston being much shorter than that of the working piston and with a correspondingly larger piston area, a crankshaft having two cranks, means connecting the pistons to the cranks and adapted to reciprocate them in their respective cylinders, and means adapted to control the passage of the incoming charge to the pump cylinder, the two cranks being angularly spaced to close the intake port by the working piston prior to the end of the pumping stroke of the pump piston.

5. In an internal combustion engine, a working piston, a ported working cylinder having an intake port and an exhaust port adjacent the end of the stroke of the piston, a pump cylinder in communication adjacent its delivery end with the intake port, a pump piston in the pump cylinder, the total displacement of the working piston being substantially equal to that of the pump piston measured at the instant the working piston closes the intake port and before the end of the pump piston stroke, the stroke of the pump piston being much shorter than that of the working piston and with a correspondingly larger piston area, a crankshaft having two angularly spaced cranks, means connecting the pistons to the cranks, and adapted to reciprocate the pistons in their respective cylinders, and means adapted to control the passage of the incoming charge to the pump cylinder, the cranks being spaced to cushion the pump piston at the end of its pumping stroke on gas trapped between it and the end of the pumping cylinder after the closure of the intake port by the working piston.

6. In an internal combustion engine having co-operating pumping and working cylinders, pistons and connecting rods and a crankshaft having angularly spaced cranks, an intake port joining the two cylinders, adjacent the end of the working stroke of the working piston and spaced from the delivery end of the pumping cylinder, the said cranks being angularly spaced whereby the working piston will close said intake port prior to the completion of the delivery stroke of the pumping piston.

7. In an internal combustion engine having co-operating pumping and working cylinders, pistons and connecting rods and a crankshaft having angularly spaced cranks, an intake port joining the two cylinders adjacent the end of the working stroke of the working piston and spaced from the delivery end of the pumping cylinder, whereby gas will be trapped inside the cylindrical walls of the pumping cylinder and between the cylinder head and the pumping piston, the cranks being angularly spaced to close the intake port by the working piston prior to the completion of the delivery stroke of the pumping piston.

In testimony whereof I affix my signature.
WILLIAM J. HUNTER.